(12) United States Patent
Sengstaken, Jr.

(10) Patent No.: US 10,318,769 B2
(45) Date of Patent: Jun. 11, 2019

(54) WIRELESS TAG APPARATUS AND RELATED METHODS

(71) Applicant: Vypin, LLC, Alpharetta, GA (US)

(72) Inventor: Robert W. Sengstaken, Jr., Hollis, NH (US)

(73) Assignee: VYPIN, LLC, Alpharetta, GA (US)

(\*) Notice: Subject to any disclaimer, the term of this patent is extended or adjusted under 35 U.S.C. 154(b) by 0 days.

(21) Appl. No.: 16/178,864

(22) Filed: Nov. 2, 2018

(65) Prior Publication Data

US 2019/0087612 A1 Mar. 21, 2019

Related U.S. Application Data

(63) Continuation of application No. 14/304,195, filed on Jun. 13, 2014, now Pat. No. 10,121,028.

(60) Provisional application No. 61/839,561, filed on Jun. 26, 2013, provisional application No. 61/974,770, filed on Apr. 3, 2014, provisional application No. 61/902,316, filed on Nov. 11, 2013, provisional application No. 61/902,325, filed on Nov. 11, 2013.

(51) Int. Cl.
*G06K 7/10* (2006.01)
*G06K 19/07* (2006.01)

(52) U.S. Cl.
CPC ..... *G06K 7/10009* (2013.01); *G06K 19/0702* (2013.01); *G06K 19/0716* (2013.01); *G06K 19/0717* (2013.01); *G06K 19/0723* (2013.01)

(58) Field of Classification Search
CPC ........... G06K 7/10009; G06K 19/0702; G06K 19/0716; G06K 19/0717; G06K 19/0723

USPC ..................................................... 340/10.34
See application file for complete search history.

(56) References Cited

U.S. PATENT DOCUMENTS

| | | |
|---|---|---|
| 4,221,280 A | 9/1980 | Richards |
| 4,617,557 A | 10/1986 | Gordon |
| 4,823,982 A | 4/1989 | Aten et al. |
| 4,922,433 A | 5/1990 | Mark |
| 5,014,851 A | 5/1991 | Wick |
| 5,323,907 A | 6/1994 | Kalvelage |
| 5,412,372 A | 5/1995 | Parkhurst et al. |
| 5,791,478 A | 8/1998 | Kalvelage et al. |
| 5,852,590 A | 12/1998 | de la Huerga |
| 5,990,647 A | 11/1999 | Lettler |
| 6,052,093 A | 4/2000 | Yao et al. |
| 6,058,374 A | 5/2000 | Guthrie et al. |

(Continued)

FOREIGN PATENT DOCUMENTS

| | | |
|---|---|---|
| KR | 20110103340 A | 9/2011 |
| WO | 2013023804 A1 | 2/2013 |

*Primary Examiner* — Steven Lim
*Assistant Examiner* — Kam Wan Ma
(74) *Attorney, Agent, or Firm* — Hayes Soloway PC

(57) ABSTRACT

An asset tag apparatus and methods of monitoring assets with an asset tag are provided. The asset tag apparatus includes a housing and a wireless transmitter located within the housing. A processor is located within the housing, wherein the processor is in communication with the wireless transmitter. An accelerometer is positioned within the housing, wherein the accelerometer is in communication with the processor, wherein a wake-up signal is transmitted from the accelerometer to the processor in response to an activation of the accelerometer, and wherein the wireless transmitter transmits a signal externally from the housing in response to the wake-up signal received by the processor.

21 Claims, 10 Drawing Sheets

(56) References Cited

U.S. PATENT DOCUMENTS

| | | | |
|---|---|---|---|
| 6,188,678 B1 | 2/2001 | Prescott | |
| 6,244,462 B1 | 6/2001 | Ehrensvard et al. | |
| 6,310,555 B1 | 10/2001 | Stern | |
| 6,325,066 B1 | 12/2001 | Hughes et al. | |
| 6,411,567 B1 | 6/2002 | Niemiec et al. | |
| 6,542,114 B1 | 4/2003 | Eagleson et al. | |
| 6,574,166 B2 | 6/2003 | Niemiec | |
| 6,720,888 B2 | 4/2004 | Eagleson et al. | |
| 7,113,101 B2 | 9/2006 | Petersen et al. | |
| 7,142,123 B1 | 11/2006 | Kates | |
| 7,263,875 B2 | 9/2007 | Hawk et al. | |
| 7,352,286 B2 | 4/2008 | Chan et al. | |
| 7,394,381 B2 | 7/2008 | Hanson et al. | |
| 7,414,571 B2 | 8/2008 | Schantz et al. | |
| 7,541,942 B2 | 6/2009 | Cargonja et al. | |
| 7,688,206 B2 | 3/2010 | Carrender | |
| 7,768,393 B2 | 8/2010 | Nigam | |
| 7,937,167 B1 | 5/2011 | Mesarina et al. | |
| 7,937,829 B2 | 5/2011 | Petersen et al. | |
| 7,940,173 B2 | 5/2011 | Koen | |
| 7,944,350 B2 | 5/2011 | Culpepper et al. | |
| 7,956,746 B2 | 6/2011 | Trusoott et al. | |
| 8,025,149 B2 | 9/2011 | Sterry et al. | |
| 8,026,814 B1 | 9/2011 | Heinze et al. | |
| 8,085,135 B2 | 12/2011 | Cohen Alloro et al. | |
| 8,102,271 B2 | 1/2012 | Heo et al. | |
| 8,125,339 B2 | 2/2012 | Neuwirth | |
| 8,193,918 B1 | 6/2012 | Shavelsky et al. | |
| 8,217,809 B2 | 7/2012 | Westhues et al. | |
| 8,279,076 B2 | 10/2012 | Johnson | |
| 8,334,773 B2 | 12/2012 | Cova et al. | |
| 8,339,244 B2 | 12/2012 | Peden, II et al. | |
| 8,351,546 B2 | 1/2013 | Vitek | |
| 8,373,562 B1 | 2/2013 | Heinze et al. | |
| 8,384,542 B1 | 2/2013 | Merrill et al. | |
| 8,395,496 B2 | 3/2013 | Joshi et al. | |
| 8,432,274 B2 | 4/2013 | Cova et al. | |
| 8,471,715 B2 | 6/2013 | Solazzo et al. | |
| 8,487,757 B2 | 7/2013 | Culpepper et al. | |
| 8,494,581 B2 | 7/2013 | Barbosa et al. | |
| 8,514,082 B2 | 8/2013 | Cova et al. | |
| 8,515,389 B2 | 8/2013 | Smetters et al. | |
| 8,526,884 B1 | 9/2013 | Price et al. | |
| 8,532,718 B2 | 9/2013 | Behzad et al. | |
| 8,548,623 B2 | 10/2013 | Poutiatine et al. | |
| 8,889,944 B2 | 11/2014 | Abraham et al. | |
| 8,960,440 B1 | 2/2015 | Kronberg | |
| 8,962,909 B2 | 2/2015 | Groosman et al. | |
| 9,102,388 B2 | 8/2015 | Lee et al. | |
| 9,387,148 B2 | 7/2016 | Rosenbaum et al. | |
| 2002/0017996 A1 | 2/2002 | Niemiec | |
| 2002/0135479 A1 | 9/2002 | Belcher et al. | |
| 2003/0007421 A1 | 1/2003 | Niemiec et al. | |
| 2003/0020615 A1 | 1/2003 | Zand et al. | |
| 2003/0036354 A1 | 2/2003 | Lee et al. | |
| 2003/0090387 A1 | 5/2003 | Lestienne et al. | |
| 2004/0000571 A1 | 1/2004 | Reiserer et al. | |
| 2004/0066302 A1 | 4/2004 | Menard et al. | |
| 2005/0052315 A1 | 3/2005 | Winterling et al. | |
| 2005/0077356 A1* | 4/2005 | Takayama | G06K 7/10237 235/451 |
| 2005/0115308 A1 | 6/2005 | Koram et al. | |
| 2005/0237198 A1 | 10/2005 | Waldner et al. | |
| 2005/0266808 A1 | 12/2005 | Reunamaki et al. | |
| 2005/0284789 A1 | 12/2005 | Carespodi | |
| 2006/0047480 A1 | 3/2006 | Lenz et al. | |
| 2006/0092031 A1 | 5/2006 | Vokey et al. | |
| 2006/0132301 A1 | 6/2006 | Stilp | |
| 2006/0202830 A1 | 9/2006 | Scharfeld et al. | |
| 2006/0218011 A1 | 9/2006 | Walker et al. | |
| 2006/0249401 A1 | 11/2006 | Lehmann et al. | |
| 2007/0044542 A1 | 3/2007 | Barguirdjian et al. | |
| 2007/0046481 A1 | 3/2007 | Vokey et al. | |
| 2007/0097792 A1 | 5/2007 | Burrows et al. | |
| 2007/0211768 A1 | 9/2007 | Cornwall et al. | |
| 2008/0053040 A1 | 3/2008 | Petersen et al. | |
| 2008/0068217 A1 | 3/2008 | Van Wyk et al. | |
| 2008/0300559 A1 | 12/2008 | Gustafson et al. | |
| 2009/0295572 A1 | 12/2009 | Grim et al. | |
| 2010/0018155 A1 | 1/2010 | Forst et al. | |
| 2010/0117836 A1 | 5/2010 | Seyed Momen et al. | |
| 2010/0182131 A1 | 7/2010 | Balthes et al. | |
| 2010/0304091 A1 | 12/2010 | Wang | |
| 2011/0028308 A1 | 2/2011 | Shah et al. | |
| 2011/0030875 A1 | 2/2011 | Conte et al. | |
| 2011/0068892 A1 | 3/2011 | Perkins et al. | |
| 2011/0077909 A1 | 3/2011 | Gregory et al. | |
| 2011/0100862 A1 | 5/2011 | Turkington et al. | |
| 2011/0105955 A1 | 5/2011 | Yudovsky et al. | |
| 2011/0128129 A1 | 6/2011 | Graczyk et al. | |
| 2011/0187393 A1 | 8/2011 | Vokey et al. | |
| 2011/0227734 A1 | 9/2011 | Ortenzi et al. | |
| 2011/0254682 A1 | 10/2011 | Sigrist Christensen | |
| 2011/0316674 A1 | 12/2011 | Joy et al. | |
| 2012/0154120 A1 | 6/2012 | Alloro et al. | |
| 2012/0161942 A1 | 6/2012 | Muellner et al. | |
| 2012/0242481 A1 | 9/2012 | Gernandt et al. | |
| 2012/0299776 A1 | 11/2012 | Lee et al. | |
| 2013/0002795 A1 | 1/2013 | Shavelsky et al. | |
| 2013/0041623 A1 | 2/2013 | Kumar et al. | |
| 2013/0072870 A1 | 3/2013 | Heppe et al. | |
| 2013/0150769 A1 | 6/2013 | Heppe | |
| 2013/0210347 A1 | 8/2013 | Ling et al. | |
| 2013/0222135 A1 | 8/2013 | Stein et al. | |
| 2013/0274663 A1 | 10/2013 | Heppe | |
| 2013/0285681 A1 | 10/2013 | Wilson et al. | |
| 2014/0026978 A1 | 1/2014 | Savaria | |
| 2014/0145848 A1 | 5/2014 | Amir | |
| 2014/0197531 A1 | 7/2014 | Bolognia | |
| 2014/0262918 A1 | 9/2014 | Chu | |
| 2014/0266760 A1 | 9/2014 | Burk, Jr. et al. | |
| 2014/0290394 A1 | 10/2014 | Grossmann et al. | |
| 2014/0354433 A1 | 12/2014 | Buco et al. | |
| 2015/0002274 A1 | 1/2015 | Sengstaken, Jr. | |
| 2015/0091702 A1 | 4/2015 | Gupta et al. | |
| 2015/0130637 A1 | 5/2015 | Sengstaken, Jr. | |
| 2015/0143881 A1 | 5/2015 | Raut et al. | |
| 2015/0148947 A1 | 5/2015 | McConville et al. | |
| 2015/0230716 A1 | 8/2015 | Heppe | |
| 2015/0286852 A1 | 10/2015 | Sengstaken, Jr. | |
| 2016/0104013 A1* | 4/2016 | Fessler | G01R 25/00 340/10.1 |
| 2016/0120758 A1 | 5/2016 | Pi et al. | |
| 2016/0274162 A1 | 9/2016 | Freeman et al. | |
| 2017/0228566 A1 | 8/2017 | Sengstaken, Jr. | |
| 2017/0256155 A1 | 9/2017 | Sengstaken, Jr. | |
| 2018/0075330 A1 | 3/2018 | Sengstaken, Jr. | |
| 2018/0075331 A1 | 3/2018 | Sengstaken, Jr. | |

\* cited by examiner

WIRELESS TAG APPARATUS AND RELATED METHODS

CROSS-REFERENCE TO RELATED APPLICATIONS

This application is a Continuation of U.S. patent application Ser. No. 14/304,195, filed on Jun. 13, 2014, and titled "Asset Tag Apparatus and Related Methods," which claims the benefit of each of: (1) U.S. Provisional Application No. 61/839,561, filed on Jun. 26, 2013, and titled "BlueTooth Asset and Sensor Tag"; (2) U.S. Provisional Application No. 61/974,770, filed on Apr. 3, 2014, and titled "An Asset Tag Apparatus and Related Methods"; (3) U.S. Provisional Application No. 61/902,316, filed on Nov. 11, 2013, and titled "Bluetooth Asset Tag Signpost"; and (4) U.S. Provisional Application No. 61/902,325, filed on Nov. 11, 2013, and titled "Bluetooth Stockbin Indicator Tag." Each of these patent applications is herein incorporated by reference in its entirety.

FIELD OF THE DISCLOSURE

The present disclosure is generally related to asset monitoring and locating and, more particularly, to an asset tag apparatus and related methods.

BACKGROUND OF THE DISCLOSURE

Radio-based asset-tracking systems are used in various enterprises, such as hospitals, moving and shipping companies, and other facilities with movable assets to track various assets to provide the enterprise or other party with knowledge of the location of the asset. The asset-tracking systems often use wireless tags that are connected to assets to help track the location of the asset. Installing the infrastructure to enable asset tracking is normally relatively expensive, and the asset tag typically has sufficient power to operate for a few months before its batteries are dead. The relatively short lifespan is due to several factors. One factor is that the tags are location-aware, which means they receive signals from infrastructure that are associated with particular locations, and the tags then have to report the location data back to an asset tracking system. The tags also normally use a two-way protocol, which includes sending a message and receiving an acknowledgement of receipt. Furthermore, the costs of the infrastructure for many conventional tracking systems, including RFID readers for passive RFID tags, can be prohibitively high to prospective users.

The need for an asset tag that has sufficient battery power to operate for the life of the asset, or a substantial portion of the life of the asset, is a critical factor in industries today. Having to replace a battery of an asset tag or replace the entirety of the asset tag is an expensive and often time-consuming process. Many assets will require tags with lifespans of many years. Additionally, it can be difficult to determine the optimal time for replacement of a battery of the asset tag, thereby leaving the user at the risk of the asset tag fully losing power and subsequently failing. Some low-power radios have been used to increase battery life, but these devices have shorter transmission range requiring the RF infrastructure to relay. When the assets being tracked are highly mobile (e.g., cattle or international shipping containers), having an asset tag which no longer functions to track the asset is highly undesirable.

Thus, a heretofore unaddressed need exists in the industry to address the aforementioned deficiencies and inadequacies.

SUMMARY OF THE DISCLOSURE

One example embodiment provides a wireless tag apparatus. The wireless tag apparatus includes a wireless receiver configured to receive a first radio frequency (RF) signal of a first frequency range, the first RF signal including data pertaining to an identity of a remote source of the first RF signal. The wireless tag apparatus further includes a wireless transmitter configured to transmit a second RF signal of a second frequency range that differs from the first frequency range, the second RF signal including the data pertaining to the identity of the remote source of the first RF signal, wherein the wireless transmitter is configured to transmit the second RF signal: at a first transmission rate when the wireless tag apparatus is in a low-power state; and at a second transmission rate when the wireless tag apparatus is in an active state, wherein the second transmission rate is greater than the first transmission rate. The wireless tag apparatus further is configured to be paired with an asset of interest such that the asset of interest is able to be wirelessly tracked utilizing a computing device external to and in wireless communication with the wireless tag apparatus.

In some cases, the first RF signal is at least one of a Wi-Fi signal and a Bluetooth signal. In some such instances, the second RF signal is a Bluetooth signal. In some such instances, the second frequency range is in an ISM band of between 2.4-2.485 GHz. In some such instances, the first frequency range is in a 915 MHz ISM band. In some other such instances, the second RF signal is encoded utilizing a Bluetooth Low Energy (BLE) communication protocol.

In some cases, the wireless receiver is configured to scan for the first RF signal for a channel scan time that is greater than a transmission period of the first RF signal.

In some cases, the second RF signal further includes data pertaining to at least one of: a unique tag address associated with the wireless tag apparatus; a manufacture code associated with the wireless tag apparatus; a status of the wireless tag apparatus; a power level of a power supply of the wireless tag apparatus; a power level of a power supply of the remote source of the first RF signal; and an output of at least one sensor of the wireless tag apparatus.

In some cases, the data pertaining to the identity of the remote source of the first signal includes a micro-zone identification code.

In some cases, the wireless transmitter is configured to transmit the second RF signal periodically. In some such instances, the wireless tag apparatus further includes a timer configured to periodically output a signal that results in transmission of the second RF signal periodically by the wireless transmitter. In some such instances, the timer is native to a processing element of the wireless tag apparatus.

In some cases, the wireless transmitter is configured to transmit the second RF signal at the second transmission rate after detection of at least one of: a movement of the wireless tag apparatus; and an impact to the wireless tag apparatus. In some such instances, the wireless tag apparatus further includes at least one sensor configured to detect an orientation of the wireless tag apparatus and the at least one of: the movement of the wireless tag apparatus; and the impact to the wireless tag apparatus. In some such instances, upon detecting the impact while the wireless tag apparatus is oriented in a first orientation, the wireless tag apparatus transitions from the low-power state to the active state, in which active state the wireless tag apparatus is permitted to wirelessly communicate with the external computing device. In some such instances, in the active state, the wireless tag apparatus enters a pairing mode through which the wireless tag apparatus wirelessly communicates with the external computing device to effectuate pairing of the wireless tag apparatus with the asset of interest. In some such instances, the impact includes at least one tap on a housing of the wireless tag apparatus. In some instances, upon detecting the impact while the wireless tag apparatus is oriented in a second orientation that differs from the first orientation, the wireless tag apparatus transitions from the active state to the low-power state.

In some cases, the wireless transmitter is configured to transmit the second RF signal at the second transmission rate after actuation of a button of the wireless tag apparatus.

In some cases, the wireless tag apparatus further includes at least one of: a moisture sensor; a humidity sensor; a temperature sensor; a proximity sensor; a Near Field Communications (NFC) reader; a Radio Frequency Identification (RFID) reader; and a magnetic field sensor.

In some cases, the first RF signal includes data that, when received by the wireless tag apparatus, at least one of: programs at least one setting of the wireless tag apparatus; causes the wireless transmitter to transmit the second RF signal at the second transmission rate; causes an alert code to be generated by the wireless tag apparatus; and causes an audio output device of the wireless tag apparatus to emit a sound.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
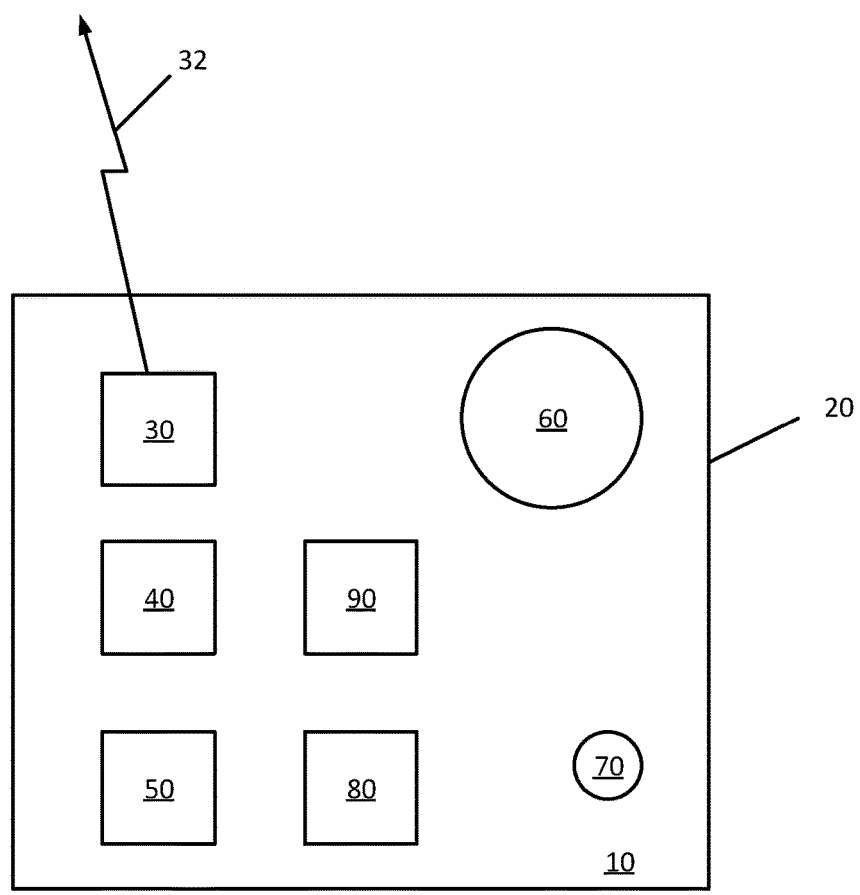
FIG. 1 is a schematic illustration of an asset tag apparatus, in accordance with a first exemplary embodiment of the present disclosure.

FIG. 1 is a schematic illustration of an asset tag apparatus 10, in accordance with a first exemplary embodiment of the present disclosure. The asset tag apparatus 10, which may be referred to simply as 'apparatus 10,' includes a housing 20. A wireless transmitter 30 is located within the housing 20. A processor 40 is located within the housing 20, wherein the processor 40 is in communication with the wireless transmitter 30. An accelerometer 50 is positioned within the housing 20, wherein the accelerometer 50 is in communication with the processor 40, wherein a wake-up signal is transmitted from the accelerometer 50 to the processor 40 in response to an activation of the accelerometer 50, and wherein the wireless transmitter 30 transmits a signal 32 externally from the housing 20 in response to the wake-up signal received by the processor 40.

The apparatus 10 may be used in a variety of industries and enterprises to track any number or type of assets. For example, the apparatus 10 may be used within shipping industries to track moving containers, or within the livestock industry to track livestock. Individually, each apparatus 10 may be used to track one asset, and, collectively, a plurality of apparatuses 10 may be used to track any number of assets.

The apparatus 10 includes a housing 20, which may provide the structure for holding other components of the apparatus 10. The housing 20 may be constructed from a durable material, such as hardened plastic, fiberglass, metal, or another type of material, and may substantially contain the wireless transmitter 30, the processor 40, and the accelerometer 50, along with other components of the apparatus 10. The housing 20 may be sealable and resistant to the elements, such that it is water-resistant, dust-proof, and resistant to other environmental conditions. It may be highly desirable to have a waterproof housing 20, since when the accelerometer 50 is used to detect activation, a waterproof housing 20 may reduce the frequency and cost of leakage failures of a pushbutton. A magnetic sensor and magnet can also be used to activate the process of transmitting a signal 32 externally from the housing 20 using the wireless transmitter 30 in response to the wake-up signal received by the processor 40, but at additional cost.

The wireless transmitter 30 is located within the housing 20 and is capable of transmitting signals 32 external of the housing 20. For example, the wireless transmitter 30 may transmit signals 32 to computerized devices capable of receiving a signal, as discussed relative to FIG. 2. While it is possible for wireless transmission according to a variety of transmission protocols, the wireless transmitter 30 may transmit the signal using short-wavelength UHF radio waves in an ISM band of between 2.4 GHz and 2.485 GHz, commonly referred to under the brand name Bluetooth®. The wireless transmitter 30 may include a variety of different types of transmitters 30 capable of transmitting a wireless signal 32. The wireless transmitter 30 may include wireless microcontrollers (MCU), where the processor 40 is integrated within the MCU. Accordingly, the processor 40 can be in communication with the wireless transmitter 30 when integrated within the MCU or when used within the apparatus 10 separate from the wireless transmitter 30. The processor 40 may include any type of central processing unit or microprocessor.

The accelerometer 50 may include any device that measures acceleration or a change in motion. The accelerometer 50 is positioned within the housing 20 and may be integrated or separated from either or both of the wireless transmitter 30 and the processor 40. In either case, the accelerometer 50 is in communication with the processor 40 such that it can transmit signals to the processor 40. The accelerometer 50 may transmit a wake-up signal or interrupt signal to the processor 40 in response to the accelerometer 50 being activated. Activating the accelerometer 50 may include any type of motion or acceleration of the accelerometer 50. As the accelerometer 50 is housed within the housing 20, the activation of the accelerometer 50 includes changes in motion or accelerations of the housing 20. For example, activation of the accelerometer 50 may include a single-tap on the housing 20, a double-tap on the housing 20, a rotation of the housing 20, an impact force received on the housing 20, and a change in orientation of the housing 20, or any other type of motion to the housing 20 or accelerometer 50 directly.

The apparatus 10 may include a variety of other components, parts, and functions. For example, the apparatus 10 may include a battery 60 located within the housing 20 and providing a quantity of power to the processor 40 and the accelerometer 50, as well as other components of the apparatus 10. The battery 60 may include any variety of battery types sufficient to power the components of the apparatus 10. An indicator 70 may also be included with the apparatus 10. The indicator 70 may include any type of device capable of providing an indication to a user of the apparatus 10, commonly in the form of a visual illumination or audible tone. For example, the indicator 70 may be an LED housed within the housing 20 which is capable of providing a visual indication, or an audible indicator which makes an audible tone, among other types of indicators 70. The apparatus 10 may further include a timer 80 positioned within the housing 20 which is capable of controlling timed transmission of instructions to the processor 40 at predetermined intervals, as will be discussed further herein.

When the apparatus 10 is in use, it may provide successful tracking of assets with efficient battery usage. To conserve battery power within the apparatus 10, the processor 40 may remain in a sleep state unless activated. The sleep state may be characterized as an idle state of functioning of the processor 40 whereby it remains inactive and uses very little or no battery 60 power. The wireless transmitter 30 may also reside in a power-conservation state unless activated by the processor 40. In use, for example, the processor 40 and wireless transmitter 30 may remain within the sleep state until activated by the accelerometer 50, which transmits a wake-up signal to the processor 40 when the accelerometer 50 is activated. Once the wake-up signal is received at the processor 40, the processor 40 may move from a sleep state to an active state. Accordingly, in this example, the processor 40 may be in a functioning state and thus use power when activated by the accelerometer 50, which can substantially preserve battery 60 power over the life of the apparatus 10. The accelerometer 50 may be in a functioning, non-idle state at all times when it is inactivated, which requires power from the battery 60. The accelerometer 50 may use less than 10 µAh (microampere-hours) of the quantity of power.

When the processor 40 is activated or awoken by receipt of the transmitted wake-up signal, the processor 40 may direct the wireless transmitter 30 to transmit the signal 32 external of the housing 20, such as to a computerized device. The specific characteristics of the signal 32 may vary depending on the design and intended use of the apparatus 10. For example, the wireless transmitter 30 may transmit the signal 32 externally from the housing 20 at a repetition rate of at least one transmission per second. While other rates of transmission of the signal 32 may be used, a rate of 10 transmissions of the signal 32 per second may allow a wireless receiver to identify the signal 32 over other signals that may be transmitted. For example, when a plurality of apparatuses 10 are used, a wireless receiver may receive hundreds of signals 32 from various apparatuses 10, which may substantially increase the time it takes to identify the signal 32. By increasing the repetition rate of transmission of the signal 32, the specific apparatus 10 transmitting that signal 32 may become more identifiable by the wireless receiver.

The timer 80 within the apparatus 10 may be used to control periodic transmissions of the signal 32 using the processor 40. While the apparatus 10 may be conserving power during a substantial portion of its use, it may be necessary to periodically transmit a signal 32 external from the housing 20 to communicate information from the apparatus 10 or to otherwise verify that the apparatus 10 is functioning properly. A wake-up signal may be communicated from the timer 80 to the processor 40 at a predetermined repetition rate, such as no more than one transmission per ten seconds; however, the repetition rate of the transmission of the wake-up signal may vary. The wireless transmitter 30 may then transmit the signal 32 externally from the housing 20 in response to the second wake-up signal at the predetermined repetition rate.

The signal 32 transmitted from the wireless transmitter 30 may include data representative of a variety of information. For example, the signal 32 may include a beacon, especially when the signal 32 is transmitted in response to a wake-up signal from the timer 80. The beacon may include a unique tag address, a manufacture code, a battery status, and sensor data, among other information. The signal 32 having the beacon may be transmitted at a specific repetition rate, wherein the specific repetition rate is dependent upon a sensor 90 located at least partially within the housing 20. Any number or type of sensors 90 may be included with the apparatus 10, housed within the housing 20. For example, the sensor 90 may include at least one of a moisture sensor, a humidity sensor, a temperature sensor, a proximity sensor, a Near Field Communications (NFC) reader, a Radio Frequency Identification (RFID) reader, and a magnetic field sensor, or another type of sensor.

Figure 2:
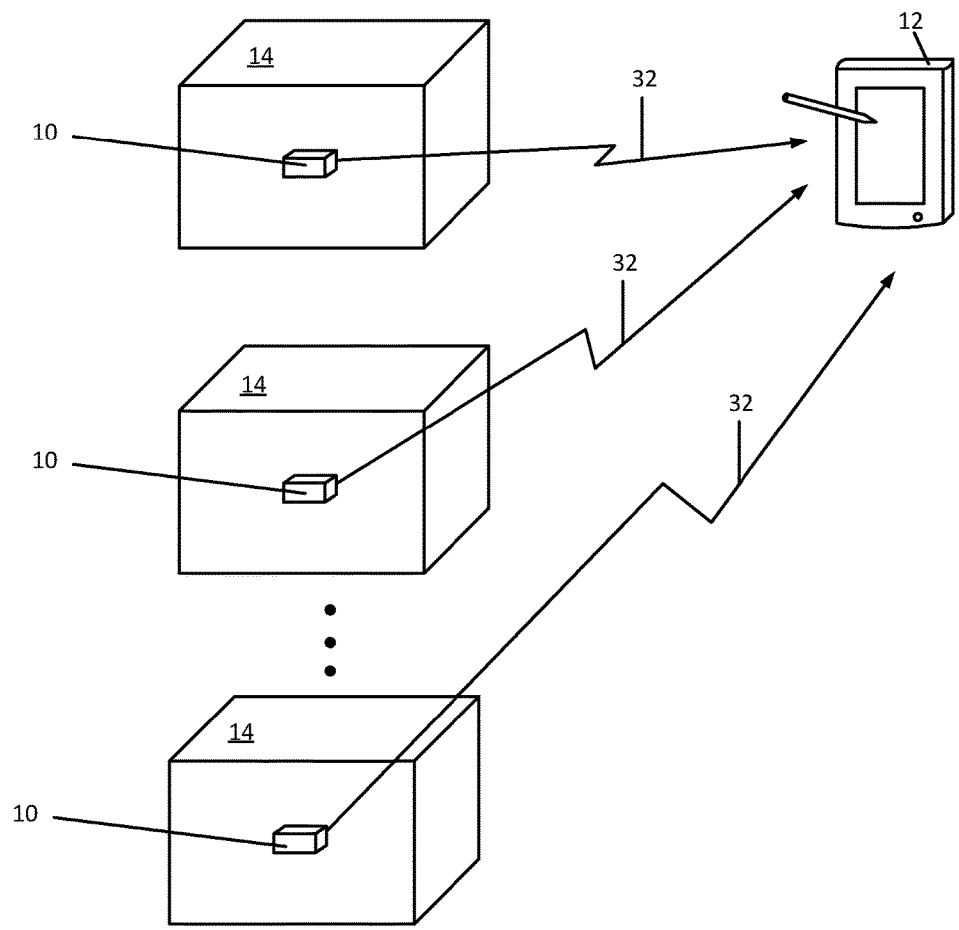
FIG. 2 is a schematic of the asset tag apparatus of FIG. 1, in accordance with the first exemplary embodiment of the present disclosure.

FIG. 2 is a schematic of the asset tag apparatus 10 of FIG. 1, in accordance with the first exemplary embodiment of the present disclosure. With reference to FIGS. 1-2, a plurality of apparatuses 10 may be used in combination with one another and in combination with a computerized device 12. As is shown in FIG. 2, each of the apparatuses 10 may be secured to an asset 14. The apparatus 10 may be secured to the asset 14 in a variety of ways, including affixing the apparatus 10 to an external surface of the asset 14, placing the apparatus 10 within the asset 14, or any other way of pairing the apparatus 10 to the asset 14 such that it stays connected to the asset 14. For example, when the apparatus 10 is used to track livestock, the apparatus 10 may be affixed to an ear of the livestock. The apparatus 10 may transmit signals 32 to the computerized device 12, depicted as a smart phone.

The computerized device 12 may include any type of computer, computer system, or other device utilizing a computer processor. For example, the computerized device 12 may include a personal computer (PC), a laptop computer, a notebook computer, a computerized smart phone, cellular phone, a PDA, a computerized tablet device, or another device. Commonly, the computerized device 12 may be a smart phone, such as an iPhone®, an Android™ phone, or any other cellular phone. The computerized device 12 may include a variety of hardware and software components, including one or more processors, memory units, databases, and/or programs or software applications, all of which are considered within the scope of the present disclosure. For example, the computerized device 12 may have a computerized program installed within a memory device therein. The computerized program may be any application software, which may be referred to in the industry as an application, or simply an "app." Current examples of these apps are commonly referred to by the entity that creates, markets or sells the app, such as Apps for iPhone® sold at an app store, or Google® apps. The app may include software code for performing a single action or multiple, related actions or tasks. The app may be compatible with, or used in conjunction with, any other type of system software, middle ware, or program.

The apparatus 10 may be enabled with conventional hardware components and software programs as well as specific apps installed within the computerized device 12 to receive the signal 32 transmitted from the apparatus 10. For example, the signal 32 may be received on a wireless receiver within the computerized device 12, such as a Bluetooth® receiver, capable of receiving short-wavelength UHF radio waves in an ISM band of between 2.4 GHz and 2.485 GHz. The functioning of the various components of the apparatus 10 and the computerized device 12 may utilize a combination of existing software within the computerized device 12 for transmitting and receiving the wireless signals 32. For example, conventional software may include software associated with the functioning of Bluetooth® communication within the computerized device 12.

Figure 3:
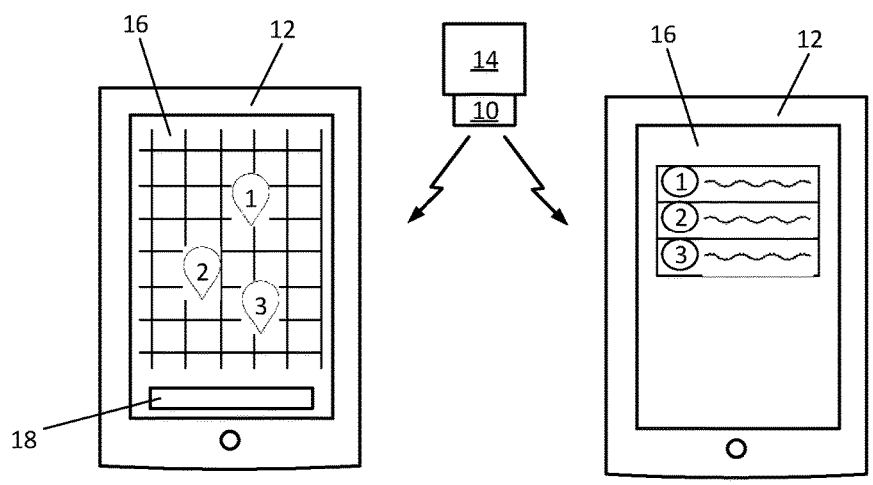
FIG. 3 is a schematic of the computerized device used with the asset tag apparatus of FIGS. 1-2, in accordance with the first exemplary embodiment of the present disclosure.

FIG. 3 is a schematic of the computerized device 12 used with the asset tag apparatus 10 of FIGS. 1-2, in accordance with the first exemplary embodiment of the present disclosure. Relative to FIGS. 2-3, the computerized device 12, through the software operating thereon, may provide a graphical user interface (GUI) 16 or display that is capable of displaying information about the apparatuses 10. For example, as is shown in FIG. 3, the computerized device 12 may include a map of a location where apparatuses 10 affixed to assets 14 are positioned, with an identification of specific apparatuses 10 on the map. The GUI 16 may further include other information 18 about the apparatuses 10, including a listing of the total number of apparatuses 10 detected.

The GUI 16 of the computerized device 12 may include a listing or indexing of apparatuses 10 that have been detected. Each of the apparatuses 10 may correspond to an item within the list displayed on the GUI 16, and each item displayed may have information indicative of the corresponding apparatus 10. For example, each item displayed may have an identification number of the apparatus 10 and an indication of activation of the apparatus 10, among other information. The indication of activation of the apparatus 10 may be a color-coded system, whereby apparatuses 10 that are currently activated, i.e., apparatuses 10 that have accelerometers 50 that are experiencing an activation, are identified in one color, whereas inactive apparatuses 10 are identified in a different color.

Figure 4:
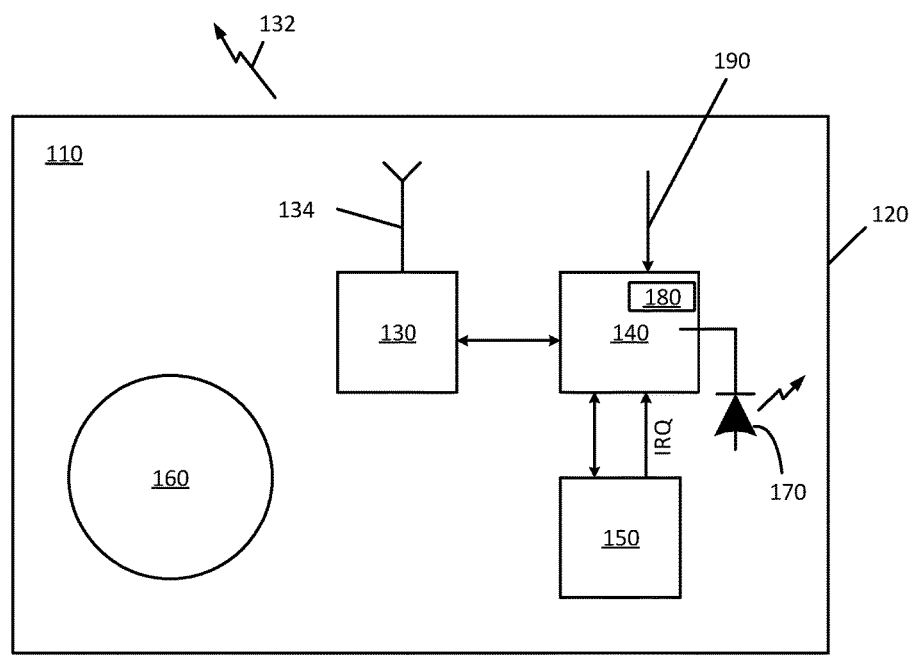
FIG. 4 is a schematic of the asset tag apparatus, in accordance with a second exemplary embodiment of the present disclosure.

FIG. 4 is a schematic of an asset tag apparatus 110, in accordance with a second exemplary embodiment of the present disclosure. The asset tag apparatus 110, which may be referred to simply as 'apparatus 110,' may include any of the aspects disclosed within any part of the entirety disclosure. The apparatus 110 includes a housing 120. A short-wavelength UHF radio wave wireless transmitter 130 is located within the housing 120, wherein the wireless transmitter 130 transmits a plurality of signals 132 in an ISM band of between 2.4 GHz to 2.485 GHz. A processor 140 is coupled to wireless transmitter 130. An accelerometer 150 is positioned within the housing 120, wherein the accelerometer 150 is in communication with the processor 140. A battery 160 is positioned within the housing 120 and provides a quantity of power to the processor 140 and the accelerometer 150, wherein the accelerometer 150 uses less than 10 µAh of the quantity of power.

The apparatus 110 of FIG. 4 may be a more-specific example of the apparatus 10 of discussed relative to FIGS. 1-2 herein. As is shown in FIG. 4, the housing 120 of the apparatus 110 may contain and house the wireless transmitter 130, the processor 140, the accelerometer 150, a battery 160, an indicator 170, a timer 180, and a sensor input 190 for connection to a sensor, among other components. Specifically, the wireless transmitter 130 may be a 2.4 GHz Digital Radio transceiver in communication with a printed PCB antenna 134. The processor 140 may include a MCU with Bluetooth® protocol enabled, to which the sensor input 190 is connected. The accelerometer 150 may include a micro electro-mechanical systems (MEMS) accelerometer in two-way communication with the processor 140. The indicator 170 may be an LED indicator which is housed at least partially within the housing 120 but is visible from a position external of the housing 120. The timer 180 may be integrated within the processor 140.

This apparatus 110 may track and locate assets (not shown) using the radio transceiver 130 using Bluetooth®-Low Energy protocol. The apparatus 110 can also be used as a sensor input for a number of applications, including to sense moisture, temperature, or other conditions. Using a Bluetooth® beacon payload to transmit the sensor data, as well as the device ID, allows a computerized device that is Bluetooth® 4.0 capable to receive the data from the sensor devices and the apparatus 110.

In accordance with the apparatus 110 of FIG. 4, the MCU may execute the Bluetooth® protocol from stored program code. The MCU may have permanent storage for a quantity of computer program and can permanently store configuration and operating parameters of the Bluetooth® protocol. To save power, the MCU is normally in sleep state where it is not running any code. The MCU is woken up to run code either from an interrupt from one of the devices on the board or by an internal timer 180. The MEMS accelerometer 150 is configured to detect various events: motion, double-tap or orientation change. The MEMS accelerometer 150 may wake up the processor 140 by means of an interrupt signal IRQ, and the MCU may send control parameters and read data from the accelerometer 150. Thus, upon detection of the event, the MEMS accelerometer 150 generates an interrupt signal IRQ to the MCU, which causes the MCU to wake up from a sleep state and process the event.

The MCU may also wake up based on an internal timer 180. An antenna 134 may be included for the MCU to transmit and receive radio frequency (RF) energy. The MCU may utilize power management to go to a low-power sleep state. The apparatus 110 may not perform a Bluetooth® connection protocol to transfer the sensor information, as it is normally transmitting only using the beacon format. Thus, the client receiver does not have to be associated with the tag 110 to receive the information.

The use of a single-tap or double-tap detected by the accelerometer 150 may signal an initial device configuration, may associate the apparatus 110 with an asset by sending special signal code for identification, and may allow a connection between Bluetooth® client and host. The orientation of the apparatus 110 when it is tapped is used to turn it on and a different orientation is used to turn it off. When it is turned off, it is no longer transmitting RF packets. The turn-off function can be disabled when the apparatus 110 is configured. The configuration can optionally be locked and never changed. A secure key code can be permanently stored; only clients that have the keycode can connect and change the operating parameters. The Bluetooth® beacon repetition rate is changed to a higher rate upon a double-tap for a period of time, and a code is sent as part of the beacon to signal the double-tap. The double-tap connection to the client can be disabled with a configuration parameter. This prevents unauthorized changes to the apparatus 110 setup.

When the accelerometer 150 generates a motion detection interrupt, motion detection can be enabled and disabled, motion sensitivity and axis of acceleration can be configured, and an indicator LED 170 flashes to show the motion has been detected. The Bluetooth® beacon repetition rate is changed to a higher rate upon motion detection for a period of time, and a code is sent as part of the beacon to signal the motion detection. The maximum amount of time in the motion detected state can be configured. This prevents the apparatus 110 from using up the battery 160 when it is in motion for a long period of time, as in truck transport. Minimum motion off time may be provided before re-enabling motion detection, such as, for example, to prevent the motion state being entered every time a truck carrying the asset tag 110 stops at a traffic light. When the accelerometer 150 generates an interrupt IRQ due to a change in orientation, orientation changes can be configured and enabled, and orientation can change time delay configuration. The apparatus 110 may include a "panic" button input used to generate an interrupt IRQ to the MCU.

The rules and protocols that are used to operate the apparatus 110 can be configured to control the beacon transmission rate. These rules are based on time and sensor inputs to provide an immediate alert status and then to reduce the beacon repetition rate to lower battery 160 usage. When the apparatus 110 is set to airplane mode of operation, it is not transmitting beacons in normal operation; it is waiting for a signal from another device to start transmitting. After the beacons are sent for a programmable period of time, the apparatus 110 then goes back to a receive-only mode. The signal to wake-up the transmitter 130 is received by a separate receiver not using the Bluetooth® protocol. The sole purpose of this receiver is to wake-up the Bluetooth® transmitter 130.

In use of the apparatus 110, it may be shipped to a user in a completely sealed and enclosed box, which makes it water and dust resistant. It is desirable to initially ship the apparatus 110 when it is not transmitting and using the battery 160 power. When it is attached to an asset, it can be activated to function. While there may be a number of ways to activate the apparatus 110 for use, one activation technique is to turn or rotate the apparatus 110 to configure the operating parameters. Each apparatus 110 transmits a unique address as one of the data fields in the periodic transmission. The apparatus 110 must be associated uniquely to the asset to which it is attached so that the asset can be tracked by the unique tag address of the apparatus 110. When the user attaches the apparatus 110 to the asset, the apparatus 110 can be double-tapped, which then allows the apparatus 110 to connect to a Bluetooth® client such as a smartphone or tablet computer for configuration of the apparatus 110.

The double-tap is detected when the apparatus 110 is tapped twice, it allows for the MCU to wake up, turn on an LED indicator 170, and transmit the address to a receiver, which can transfer the device address to a server database. This allows for a simple and quick process to associate the tag 110 to an asset. In addition, the double-tap interrupt can be used for a number of other purposes such as: initial device deployment, turning the device on, package identification, and connecting to a Bluetooth® client to configure operating parameters. The indicator LED 170 can be used for operator feedback that this state has been entered. The double-tap state can be terminated either by a time-out period or by receiving a data packet.

The orientation of the apparatus 110 is detected at the double-tap event, which allows for the apparatus 110 to be in a 'turn-on' state when right-side-up or a 'turn-off' state when upside-down. Other orientation events are possible with the double-tap. It is even possible to detect the direction of the tap as well as orientation to determine if two or more apparatuses 110 are tapped against each other. After a double-tap event, the apparatus 110 will allow connections to a Bluetooth® client using the Bluetooth® connection protocol. Once it has been connected, the client can set operating parameters in the apparatus 110. To prevent unauthorized connections in the future, the client can set a parameter to permanently lock out any further connections to clients, or it can set a password keycode.

Motion interrupt will activate the accelerometer 150 to wake up or activate the MCU/processor 140 from a sleep state, which allows transmission of the beacons at a higher rate to notify when the asset is being moved. Logic in the tag 110 will automatically turn off the high rate of broadcasts after a period of time and reset only after a delay. This solves the problem of not running down the battery 160 while an apparatus 110 is in shipment in a vehicle. The apparatus 110 will stop transmitting until the vehicle is stopped for a period of time which would typically be longer than being stopped in normal traffic. Tilt interrupt can be used to notify if the asset has been tilted on its side or if the apparatus 110 is mounted on a cover, it can indicate if the asset is opened. Additional sensors may be added to the apparatus 110 to monitor temperature, moisture, or other environmental conditions over a period of time.

Example 1: Setup Parameters & Operating Conditions

Initially, the apparatus 110 is in an idle mode with motion detection and radio broadcast disabled until a first double-tap event, which allows initial shipment with lowest battery 160 usage. A double-tap with apparatus 110 with LED indicator 170 facing down shuts down the apparatus 110. The apparatus 110 will not be broadcasting in this mode. The LED indicator 170 will alternate flashing red/green for 10 seconds and shut off. With a double-tap with the apparatus 110 on its side or facing up, the apparatus 110 will wake up and allow connection to a Bluetooth® host for configuration.

If no host connects, the apparatus 110 will be left in an active state, sending Bluetooth® beacons every 10 seconds and detecting motion.

The apparatus 110 may use the following setup parameters:
1. Motion: Enable/Disable/Enable with Double-Tap (default: Enable with Double-Tap)
2. Broadcast: Enable/Disable/Enable with Double-Tap (default: Enable with Double-Tap)
3. Motion LED Enable/Disable
4. Lock Configuration—Disables all parameter writes, disables Double-Tap turn-off
5. Motion On Time—Changes operation of the motion state to save on battery power to transmit at the Idle Broadcast frequency and turns off the motion LED. In increments of 30 seconds. This saves battery power for a long truck delivery. The device will broadcast with the motion bit set but at the idle broadcast repetition rate.
6. Motion Off Time—Time delay to enable a new motion event. The purpose is to prevent a new motion event after a momentary stop in motion.
7. Motion Broadcast repetition rate—100 ms to 10 seconds.
8. Idle Broadcast repetition rate—100 ms to 10 seconds.
9. Motion Sensitivity: 0 to 10 (10 most sensitive, default 5)
10. Double-Tap Sensitivity: 0 to 10 (10 most sensitive, default 5)
11. Orientation direction wakeup (1-6), 0 disable Example 2: Airplane Mode The apparatus 110 must not transmit over the radio while on an aircraft. The use of the Bluetooth® radio in a normal operation has the slave devices (asset tracking tags) broadcasting periodically. The operation of the slave device may be changed to operate in a host mode to receive a signal from a control device to turn on the transmitter of the apparatus 110. Using this method, the apparatus 110 aboard the aircraft may be totally passive, only waiting for a signal to turn on.

In detail, the apparatus 110 will be scanning for a beacon from a device such as a smartphone or tablet with a Bluetooth® radio. To prevent any device waking up the transmitter on the asset tags, a unique code is sent with the broadcast signal. This code is programmed into the apparatus 110 when it is configured. This unique code can be configured just once or each time the tag is used. Once the apparatus 110 has been activated or woken-up by the controlling device, it will start transmitting its address in a Bluetooth® beacon for a period of time, such as 5 minutes or more. This time period can be configured in the apparatus 110. The smartphone will continue to transmit the beacon with the wakeup code for a period of time. During this time period, all of the apparatuses 110 within RF range will wake up and start transmitting their own beacons. The rate of transmission of beacons can be programmed to be from milliseconds to 10 seconds between packets. The computerized device will then start scanning for Bluetooth® devices. It will find the beacons from all of the apparatuses 110 which are woken up. The beacon contains multiple fields of data, including a device address, transmitter power, and other optional data fields. These data fields could be used to transmit sensor data, such as temperature or acceleration.

The apparatus 110 may use the following enablement of airplane mode of operation parameters:

1. Enable/Disable Airplane Mode
2. Airplane Mode Broadcast time—maximum time to broadcast (minutes) after enabled by host device.
3. Host Device ID1—only turn on broadcast mode for Bluetooth® host matching this ID.
4. Host Device ID2—only turn on broadcast mode for Bluetooth® host matching this ID.
5. Host Device ID3—only turn on broadcast mode for Bluetooth® host matching this ID.
6. Host Device ID4—only turn on broadcast mode for Bluetooth® host matching this ID.

Figure 5:
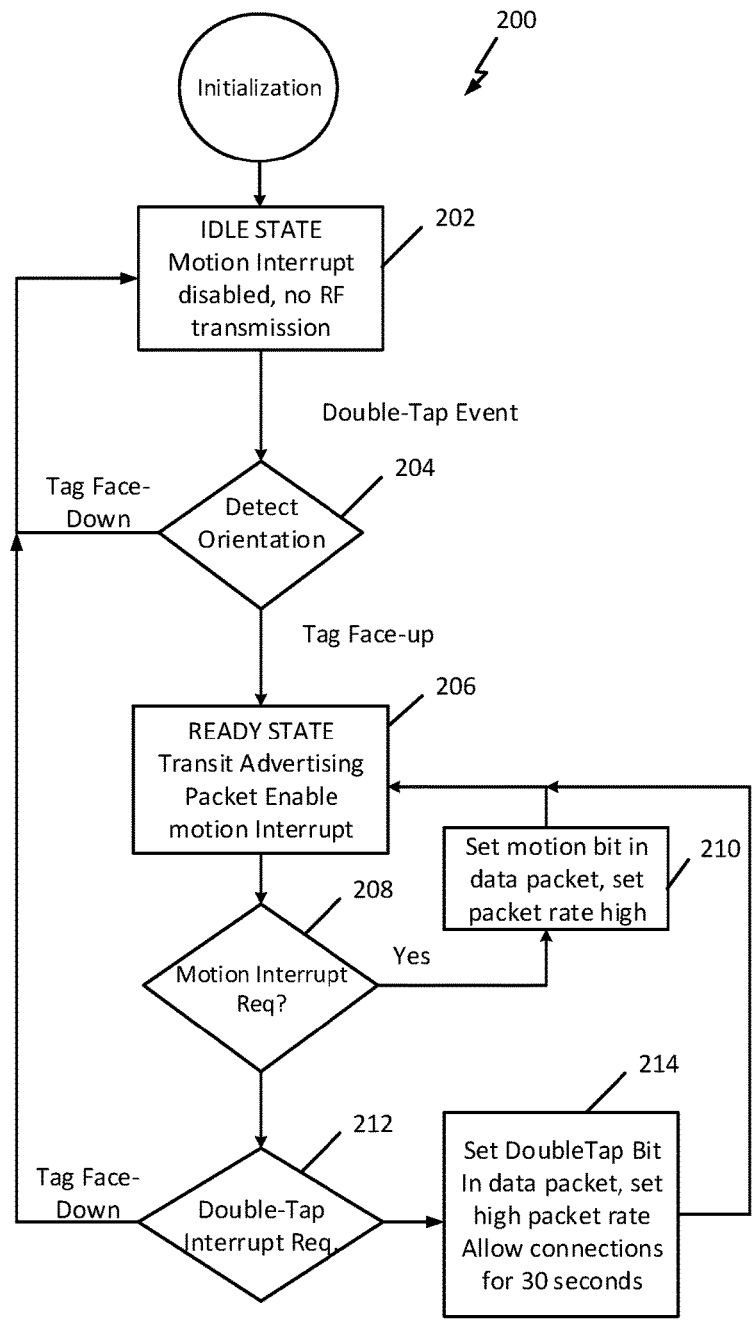
FIG. 5 is a flowchart of a use of the asset tag apparatus of FIG. 4, in accordance with the second exemplary embodiment of the present disclosure.

FIG. 5 is a flowchart 200 of a use of the asset tag apparatus 110 of FIG. 4, in accordance with the second exemplary embodiment of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown in FIG. 5, the apparatus may be initialized at an idle state, where motion interruption is disabled and there is no RF transmission (block 202). A double-tap event may activate the apparatus, at which point it detects whether it is oriented face-down or face-up (block 204). If the apparatus is detected to be face-down, it reverts to the idle state. If it is oriented face-up, the apparatus is moved to a ready state, whereby transmission of a beacon and enablement of motion interruption is provided (block 206). If motion interruption (block 208) is required, the motion bit is set in the data packet, and the packet rate is set to a high rate (block 210). If motion interruption (block 208) is not required, a double-tap interruption is required (block 212). If the apparatus is face-down, it reverts to the idle state, and if it is face-up, a double-tap bit is set in the data packet, which is set to a high rate of transmission, and connections are allowed for 30 seconds (block 214). Other combinations of tag positioning when double-tapped are possible to make the apparatus less susceptible to accidental activation or deactivation.

Figure 6:
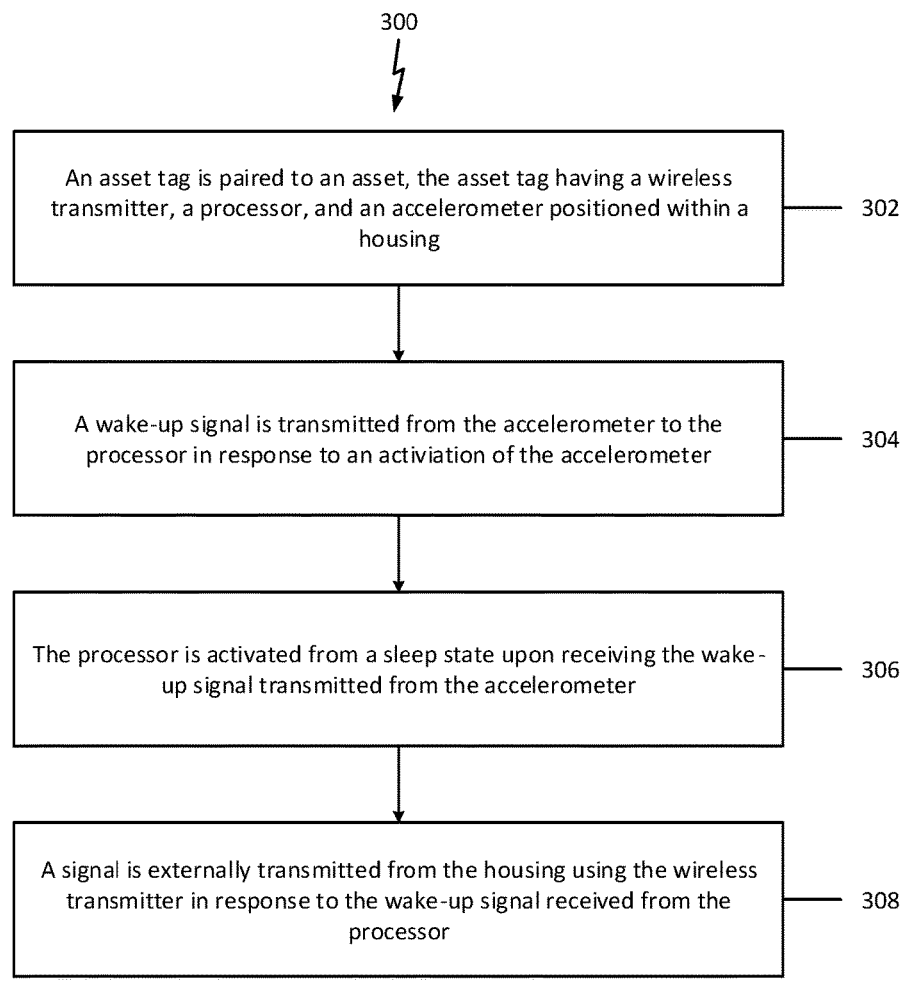
FIG. 6 is a flowchart illustrating a method for tracking an asset with a tagging system, in accordance with a third exemplary embodiment of the disclosure.

FIG. 6 is a flowchart 300 illustrating a method for tracking an asset with a tagging system, in accordance with a third exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 302, an asset tag is paired to an asset, the asset tag having a wireless transmitter, a processor, and an accelerometer positioned within a housing. A wake-up signal is transmitted from the accelerometer to the processor in response to an activation of the accelerometer (block 304). The processor is activated from a sleep state upon receiving the wake-up signal transmitted from the accelerometer (block 306). A signal externally transmitted from the housing using the wireless transmitter in response to the wake-up signal received by the processor (block 308).

The method may include any number of additional steps, processes, or functions, including all disclosed within this disclosure. For example, the signal may be externally transmitted from the housing using the wireless transmitter, and the method may further comprise transmitting the signal using short-wavelength UHF radio waves in an ISM band of between 2.4 GHz and 2.485 GHz. A second wake-up signal may be transmitted from a timer to the processor, wherein the timer is located within the housing, wherein the wireless transmitter transmits the signal externally from the housing in response to the second wake-up signal. Transmitting the signal from the wireless transmitter at a first predetermined repetition rate in response to the first wake-up signal may be done at a greater repetition rate than the repetition rate when transmitting the signal from the wireless transmitted at a second predetermined repetition rate in response to the second wake-up signal. A quantity of power may be provided to at least the processor and the accelerometer, wherein the accelerometer uses less than 10 μAh of the quantity of power.

Figure 7:
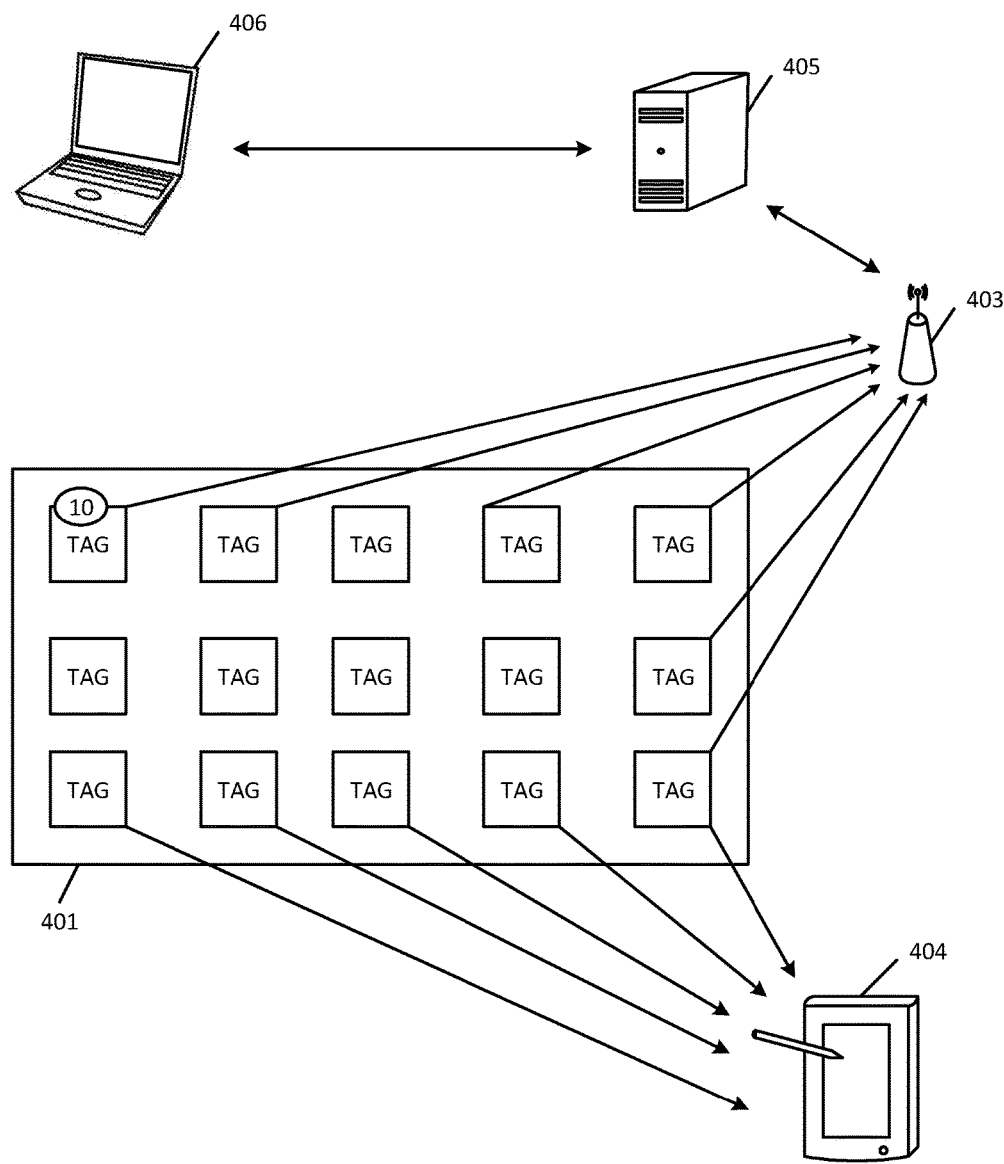
FIG. 7 is a schematic illustration of the asset tag apparatus, in accordance with the first exemplary embodiment of the present disclosure, in use with a stockroom shelf environment.

In accordance with all embodiments of this disclosure and with reference to the first exemplary embodiments, the following are example potential uses of the apparatus 10:

FIG. 7 is a schematic illustration of the asset tag apparatus 10, in accordance with the first exemplary embodiment of the present disclosure, in use with a stockroom shelf environment. The apparatus 10 may be used in commercial retail environments to track and manage stocking and/or replenishment of retail items for sale on a store shelf. For example, the apparatus 10 may be placed on a store shelf proximate to products for sale. FIG. 7 illustrates a rack 401 of bins each with an apparatus 10 attached to the front. The apparatuses 10 broadcast a Bluetooth beacon periodically, which is received by a tablet computer 404 or by a fixed Bluetooth reader 403. Either of these devices can forward the tag broadcast data packets to a server 405. The status of the tags and alerts for empty bin status can be viewed from the server on any web-enabled computer 406 or tablet 404.

Figure 8:
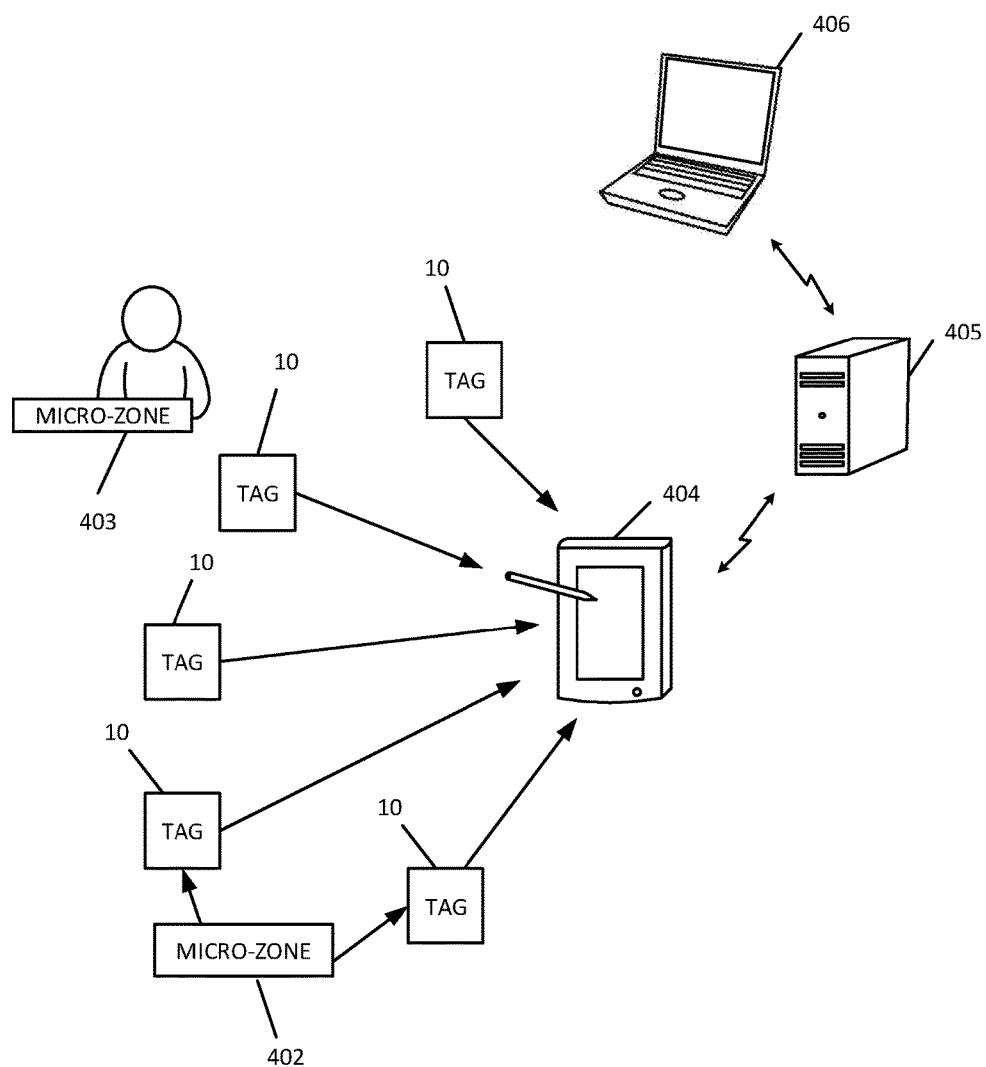
FIGS. 8-10 are schematic illustrations of the asset tag apparatus, in accordance with the first exemplary embodiment of the present disclosure, in use with a micro-zone environment.
Figure 9:
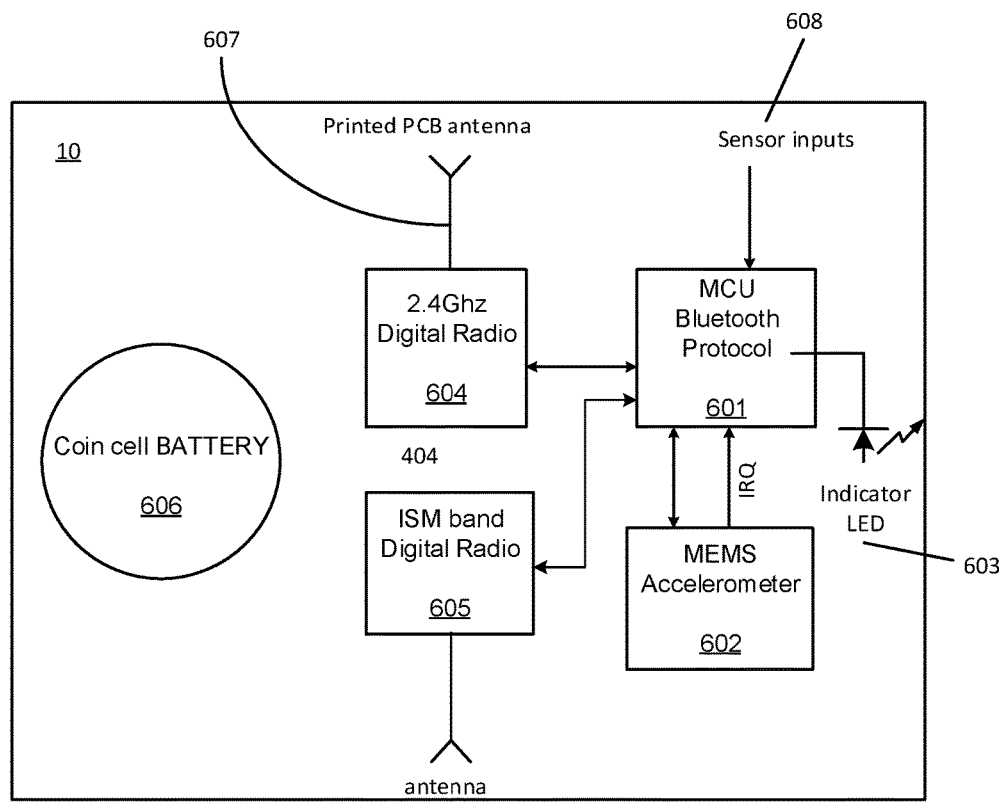
Figure 10:
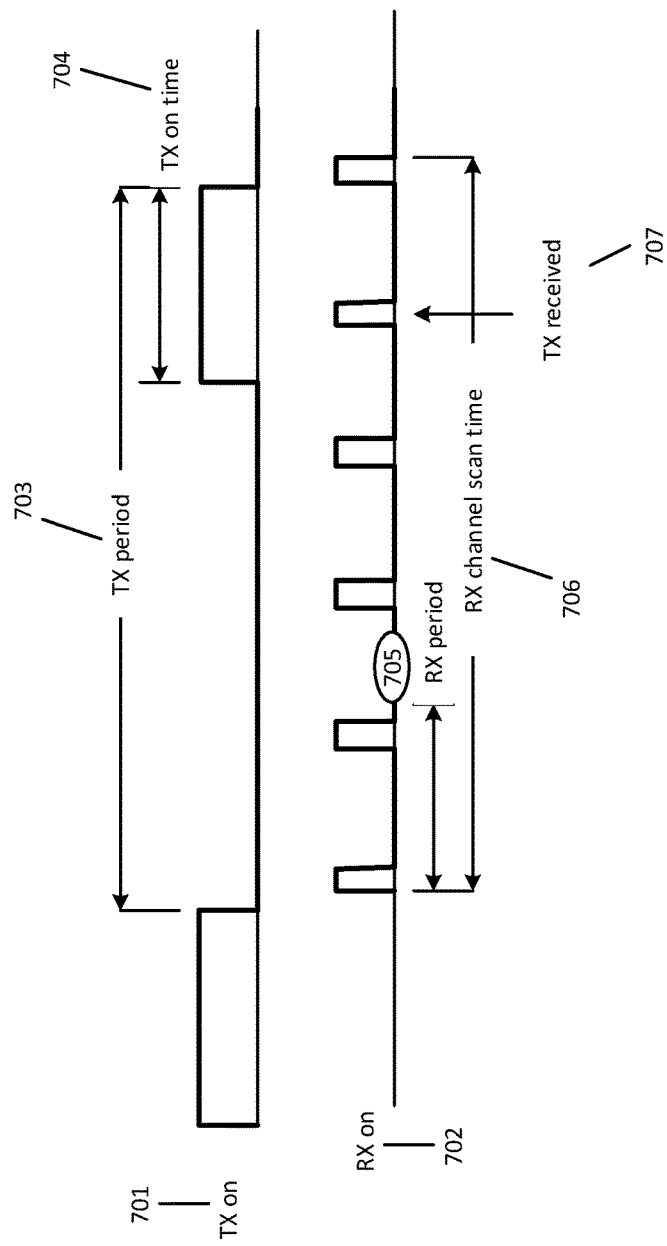

The apparatuses 10 may be positioned in a normal position when the retail product they are corresponding with is not in need of restocking. When the product needs restocking, the person managing restocking may rotate the apparatus 10 180 degrees or another rotation amount. The apparatus 10 will detect the orientation and will send the re-stock status in the Bluetooth beacon broadcast. This rotation will prompt a visual print on the tablet 404 or computer 406 that the product is in need of restocking. There are some configurations where there may be a second bin, for example, behind the first bin for reserve stock. If the reserve stock bin goes low, the stock tag can be double-tapped when it is in the re-stock rotated position. The apparatus 10 will then broadcast a beacon with a critical restock status to the server to get immediate attention for refilling the bin. Thus, the apparatus 10 may provide electronic notification of which products within the retail environment need restocking. In another example, rotation detection of an apparatus 10 may send an indication on a factory floor or within a bar or restaurant setting, rotation of the apparatus 10 may send an indication to the wait staff for service request. FIGS. 8-10 are schematic illustrations of the asset tag apparatus 10, in accordance with the first exemplary embodiment of the present disclosure, in use with a micro-zone environment. In this example, the apparatus 10 may be used for the tracking of items, such as livestock, palletized assets, medical equipment, moving boxes, or other items. The smartphone may provide the GPS coordinates for a smartphone 404 and all of the apparatuses 10 within range. The micro-zone 402/403 may provide a location within a very short distance of under 20 feet with one use as a chokepoint detection of apparatuses 10 moving past. A micro-zone may be comprised of an ISM band (915 MHz) transmitter with a programmable transmit power with the Bluetooth transceiver for configuration. The transmit power may be limited to transmit a very short range of under 20 feet.

Referring to FIG. 8, the apparatuses 10, which are mounted on assets, are each transmitting a beacon to any smartphone or tablet 404 that is within range. This device could also be a fixed device which bridges the Bluetooth protocol to forward the data packets to a server 405. The user interface on the tablet 404 allows for identification and configuration of the apparatuses 10 to the assets. The identification of one apparatus 10 in the group is accomplished by a double-tap detection on the apparatus 10. When the apparatus 10 is double-tapped, the internal accelerometer generates an interrupt of the MCU, and the double-tap status is sent in the Bluetooth beacon packet. Additionally, the accelerometer can detect tag motion and send in-motion status in the beacon data packet. When the apparatus 10 is double-tapped, the tag identification code is associated with an asset identification by the application running on the smartphone 404. This association is stored on the server 405 and forwarded to other smartphones as needed.

To detect when the apparatus 10 is in proximity of a micro-zone 402, the ISM band receiver in the apparatus 10 periodically turns on to detect the RF energy and to decode the data packet from the micro-zone which contains the micro-zone identification code. This micro-zone identification code is then sent in the Bluetooth beacon packet.

Some system configurations implement fixed micro-zones 402 and mobile micro-zones 403. For the tag to receive packets from both micro-zones, the mobile micro-zones 403 are programmed to transmit on different frequency channels within the ISM bands than the fixed micro-zones 402. Since there may be multiple micro-zones within range of the tag, the micro-zones have an anti-collision algorithm when transmitting to minimize the likelihood of corruption if two devices are transmitting simultaneously. In addition, the receiver in the tag is scanning multiple frequency channels to detect the micro-zones. Since the apparatus 10 is scanning for micro-zones at a low duty cycle to save on power usage, it will not detect a micro-zone immediately. It may take several seconds before the micro-zone is detected, but this is not a problem in the implementation where the apparatuses 10 are not moving rapidly, and the responsiveness or detection rate can be programmed trading off with power usage. In the case where the apparatus receives multiple micro-zones, the apparatus may transmit the micro-zone identification codes which have the strongest signal, implying the apparatus is closest to these.

The tablet 404 is used to forward the identification codes and the status of each tag to the server 405, and the tablet 404 adds GPS location to the data when it is sent. The database on the server 405 is formatted for display using a web-browser on any computer or tablet, thus providing near real-time status of tag locations.

The tag block diagram is shown in FIG. 9. The micro-zone configuration may be programmed to transmit on the ISM band radio, and the apparatus 10 only receives on this radio. The system is comprised of a MCU 601, which includes program storage for operating code and Bluetooth protocol, RAM for variable data, and time-based for operation. To save power, the MCU 601 is normally in sleep state where it is not running any code. The MCU 601 is woken up to run code either from an interrupt from one of the devices on the board or by an internal timer. The Micro-Electro-Mechanical Systems (MEMS) accelerometer 602 is configured to detect various events: motion, double-tap, or orientation change. Upon detection of the event, the accelerometer 602 generates an interrupt signal to the MCU 601, which causes the MCU 601 to wake up from a sleep state and process the event. The interrupt signal received by the MCU 601 may be sensed via a sensor input 608 having a sensor connected thereto. In some cases, the MCU 601 may flash the LED 603 to provide user feedback. The wireless transmitter 604 may be a 2.4-GHz radio, which may be incorporated within the same IC package with the MCU 601. This radio provides the Bluetooth compatible communication. The wireless transmitter 604 is in communication with a printed PCB antenna 607.

Normally, the MCU 601 will wake-up at a fixed periodic rate and then enable this radio transmitter to send out a short beacon packet. This may be done at a very low duty cycle, which may save on power. The Bluetooth beacon period is programmable and changed depending on the state of the apparatus 10. For example, if the apparatus 10 is idle, then the beacon rate is very low, normally every 10 seconds. Upon detection of motion or other interrupt, the beacon rate will be much higher so that this change of status will be received immediately. The ISM band radio transceiver 605 is programmed to receive only in the apparatus 10. In the micro-zone configuration, this transceiver is programmed to transmit, and the range or transmit power can be configured, as well as the transmit frequency channels. Power to the tag is provided by one or more coin-cell batteries 606, which can provide power to operate the apparatus 10 for up to 10 years depending on the size of the battery chosen.

To avoid channel interference, the micro-zone will transmit on multiple frequency channels, and mobile micro-zones will transmit on different frequency channels than fixed micro-zones so that they will not interfere with each other. Before turning on the transmitter 701, the micro-zone will perform a clear-channel-assessment to determine if there is another transmitter 701 within range so that the two do not interfere with each other. To save on power, the transmitter 701 is programmed to transmit only for a percentage of the time allotted, and it is off for the rest of the time. FIG. 10 illustrates the timing for the transmitter 701 and receiver 702. The transmitter 701 only transmits during the transmit on-time 704, and the receiver only receives during receiver on-time 707. Since the transmitter 701 is only transmitting at a fixed period 703, in order for the receiver 702 to find the transmitter 701, it must scan each channel for a RX channel scan time 706 which is longer than the TX period. In addition, the RX period 705 must be less than the TX on-time 704. The receiver 702 may scan multiple frequency channels, each channel for the RX channel scan time 706. The receiver 702 can be programmed to detect and skip frequency channels that have interferers which do not transmit a valid packet.

It is also noted that the receivers 702 within the apparatuses 10 in use with the micro-zone can be programmed the micro-zone transmitter to transmit, at a high power a "find me" identification signal. This high-power identification signal may allow that specific apparatus 10 to be found more easily relative to other apparatus 10 in use. All apparatuses 10 may receive this signal and, upon reception the selected apparatus 10, may send out a beacon at a high repetition rate so it can be easily located among other apparatuses 10.

As is described herein, the apparatus 10 may be used for tracking a variety of items within a variety of industries. For example, the example described relative to FIGS. 8-10 may be used for the tracking of livestock, such as a herd of cattle. Similarly, the apparatus 10 may be used for tracking industrial assets, such as machinery, stock material (wires, metals, etc.), and other industrial items. The apparatus 10 may also be used for tracking military equipment such as palletized defense items. Also, the apparatus 10 may prove beneficial when used in medical settings to track hospital beds, equipment, and other transportable medical items. Further, the apparatus 10 may offer superior benefits in tracking items within the moving industry, such as moving boxes, shipping containers, or similar structures having goods being moved or shipped.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A wireless tag apparatus comprising:
   a wireless receiver configured to receive a first radio frequency (RF) signal of a first frequency range, the first RF signal including data pertaining to an identity of a remote source of the first RF signal; and
   a wireless transmitter configured to transmit a second RF signal of a second frequency range that differs from the first frequency range, the second RF signal including the data pertaining to the identity of the remote source of the first RF signal, wherein the wireless transmitter is configured to transmit the second RF signal:
      at a first transmission rate when the wireless tag apparatus is in a low-power state; and
      at a second transmission rate when the wireless tag apparatus is in an active state, wherein the second transmission rate is greater than the first transmission rate;
   wherein the wireless tag apparatus is configured to be paired with an asset of interest such that the asset of interest is able to be wirelessly tracked utilizing a computing device external to and in wireless communication with the wireless tag apparatus.

2. The wireless tag apparatus of claim 1, wherein the first RF signal is at least one of a Wi-Fi signal and a Bluetooth signal.

3. The wireless tag apparatus of claim 2, wherein the second RF signal is a Bluetooth signal.

4. The wireless tag apparatus of claim 3, wherein the second frequency range is in an ISM band of between 2.4-2.485 GHz.

5. The wireless tag apparatus of claim 4, wherein the first frequency range is in a 915 MHz ISM band.

6. The wireless tag apparatus of claim 4, wherein the second RF signal is encoded utilizing a Bluetooth Low Energy (BLE) communication protocol.

7. The wireless tag apparatus of claim 1, wherein the wireless receiver is configured to scan for the first RF signal for a channel scan time that is greater than a transmission period of the first RF signal.

8. The wireless tag apparatus of claim 1, wherein the second RF signal further includes data pertaining to at least one of:

a unique tag address associated with the wireless tag apparatus;

a manufacture code associated with the wireless tag apparatus;

a status of the wireless tag apparatus;

a power level of a power supply of the wireless tag apparatus;

a power level of a power supply of the remote source of the first RF signal; and an output of at least one sensor of the wireless tag apparatus.

9. The wireless tag apparatus of claim 1, wherein the data pertaining to the identity of the remote source of the first signal includes a micro-zone identification code.

10. The wireless tag apparatus of claim 1, wherein the wireless transmitter is configured to transmit the second RF signal periodically.

11. The wireless tag apparatus of claim 10, further comprising a timer configured to periodically output a signal that results in transmission of the second RF signal periodically by the wireless transmitter.

12. The wireless tag apparatus of claim 11, wherein the timer is native to a processing element of the wireless tag apparatus.

13. The wireless tag apparatus of claim 1, wherein the wireless transmitter is configured to transmit the second RF signal at the second transmission rate after detection of at least one of:

a movement of the wireless tag apparatus; and an impact to the wireless tag apparatus.

14. The wireless tag apparatus of claim 13, further comprising at least one sensor configured to detect an orientation of the wireless tag apparatus and the at least one of:

the movement of the wireless tag apparatus; and the impact to the wireless tag apparatus.

15. The wireless tag apparatus of claim 14, wherein upon detecting the impact while the wireless tag apparatus is oriented in a first orientation, the wireless tag apparatus transitions from the low-power state to the active state, in which active state the wireless tag apparatus is permitted to wirelessly communicate with the external computing device.

16. The wireless tag apparatus of claim 15, wherein in the active state, the wireless tag apparatus enters a pairing mode through which the wireless tag apparatus wirelessly communicates with the external computing device to effectuate pairing of the wireless tag apparatus with the asset of interest.

17. The wireless tag apparatus of claim 16, wherein the impact comprises at least one tap on a housing of the wireless tag apparatus.

18. The wireless tag apparatus of claim 15, wherein upon detecting the impact while the wireless tag apparatus is oriented in a second orientation that differs from the first orientation, the wireless tag apparatus transitions from the active state to the low-power state.

19. The wireless tag apparatus of claim 1, wherein the wireless transmitter is configured to transmit the second RF signal at the second transmission rate after actuation of a button of the wireless tag apparatus.

20. The wireless tag apparatus of claim 1, further comprising at least one of:

a moisture sensor;

a humidity sensor;

a temperature sensor;

a proximity sensor;

a Near Field Communications (NFC) reader;

a Radio Frequency Identification (RFID) reader; and a magnetic field sensor.

21. The wireless tag apparatus of claim 1, wherein the first RF signal includes data that, when received by the wireless tag apparatus, at least one of:

programs at least one setting of the wireless tag apparatus;

causes the wireless transmitter to transmit the second RF signal at the second transmission rate;

causes an alert code to be generated by the wireless tag apparatus; and causes an audio output device of the wireless tag apparatus to emit a sound.

* * * * *